United States Patent
Hsu et al.

(10) Patent No.: US 9,262,026 B2
(45) Date of Patent: Feb. 16, 2016

(54) CAPACITIVE TOUCH DEVICE AND SENSING METHOD THEREOF

(71) Applicant: SILICON INTEGRATED SYSTEMS CORP, Hsinchu (TW)

(72) Inventors: Jih-Ming Hsu, Hsinchu (TW); Chia-Yi Chu, Hsinchu (TW); Chin-Hua Kuo, Hsinchu (TW)

(73) Assignee: SILICON INTEGRATED SYSTEMS CORP., Hsinchu (TW)

( * ) Notice: Subject to any disclaimer, the term of this patent is extended or adjusted under 35 U.S.C. 154(b) by 21 days.

(21) Appl. No.: 14/213,250

(22) Filed: Mar. 14, 2014

(65) Prior Publication Data

US 2015/0261342 A1    Sep. 17, 2015

(51) Int. Cl.
G06F 3/044    (2006.01)
G06F 3/041    (2006.01)

(52) U.S. Cl.
CPC .............. *G06F 3/044* (2013.01); *G06F 3/0416* (2013.01)

(58) Field of Classification Search
CPC ........................................................ H03M 7/00
USPC ........................................................ 345/173
See application file for complete search history.

(56) References Cited

U.S. PATENT DOCUMENTS

| 2012/0081301 A1* | 4/2012 | Lin et al. ........................ 345/173 |
| 2014/0093181 A1* | 4/2014 | Nakayama .................... 382/233 |

\* cited by examiner

*Primary Examiner* — Sahlu Okebato
(74) *Attorney, Agent, or Firm* — Hauptman Ham, LLP

(57) ABSTRACT

A capacitive touch device and a sensing method thereof are disclosed. The capacitive touch device includes a touch panel, at least one touch detection unit and a processing unit. The touch detection unit scans the touch panel, obtains an N-bit sensed data and compresses the N-bit sensed data to an L-bit sensed data. The processing unit receives the L-bit sensed data, decompresses the L-bit sensed data to the N-bit sensed data and calculates a coordinate of a touch according to the N-bit sensed data. The present invention is capable of decreasing the time for transmitting the sensed data, the power consumption and the requirements for the memory capacity of the touch detection unit and the memory capacity of the processing unit.

14 Claims, 4 Drawing Sheets

CAPACITIVE TOUCH DEVICE AND SENSING METHOD THEREOF

TECHNICAL FIELD OF THE INVENTION

The present invention relates to a capacitive touch device, more particularly, to a capacitive touch device and a sensing method thereof.

BACKGROUND OF THE INVENTION

When a capacitive touch panel is applied to a large scale device, a number of sensing lines is increasing. Furthermore, requirements for accelerating sensing speed and calculating scan results are also increasing.

In an axis intersect (AI) capacitance sense technology, a coordinate of a touch is detected by a self-capacitance sensing method. However, a problem of ghost point occurs in the AI capacitance sense technology. As a result, a multi-point touch cannot be detected. In contrast, in an all-points addressable (APA) capacitance sense technology, a coordinate of a touch is usually detected by a mutual-capacitance sensing method. Accordingly, a multi-point touch can be detected in the APA capacitance sense technology.

A capacitive touch device comprises a touch panel, a plurality of touch integrated circuits (IC) and a processing unit. Currently, there are two methods to calculate a coordinate of a touch. In a first method, the touch ICs scan the touch panel for obtaining sensed data and calculates the coordinate of the touch according to the sensed data. After the coordinate of the touch is calculated, the coordinate of the touch is transmitted to the processing unit. In a second method, because the arithmetic capability of the processing unit is better than that of the touch ICs, and the coordinate of the touch is calculated by the processing unit to increase the speed of obtaining the coordinate of the touch. More particularly, the touch ICs scan the touch panel for obtaining the sensed data. Then, the touch ICs transmit the sensed data to the processing unit, and the processing unit calculates the coordinate of the touch according to the sensed data. In summary, the touch ICs transmits the coordinate of the touch to the processing unit in the first method, while the touch ICs transmits the sensed data to the processing unit in the second method. A quantity of the sensed data is large than a quantity of the coordinate of the touch. Accordingly, time for transmitting the sensed data is more than time for transmitting the coordinate of the touch especially when the capacitive touch device adopts the all-points addressable (APA) capacitance sense technology. Furthermore, power consumption is increasing when the large amount of the sensed data is transmitted to the processing unit.

Therefore, there is a need for a solution to solve the above-mentioned problem that the quantity of the sensed data is large when the touch ICs transmit the sensed data to the processing unit.

SUMMARY OF THE INVENTION

An objective of the present invention is to provide a capacitive touch device and a sensing method thereof.

In accordance with an aspect of the present invention, the capacitive touch device comprises a touch panel, at least one touch detection unit and a processing unit. The touch detection unit is electrically coupled to the touch panel for scanning the touch panel, obtaining an N-bit sensed data in a current frame and compressing the N-bit sensed data in the current frame to an L-bit sensed data in the current frame. N and L are positive integers, and L is smaller than N. The processing unit is electrically coupled to the touch detection unit for receiving the L-bit sensed data in the current frame, decompressing the L-bit sensed data in the current frame to the N-bit sensed data in the current frame and calculating a coordinate of a touch according to the N-bit sensed data in the current frame.

In accordance with another aspect of the present invention, the sensing method of the capacitive touch device of the present invention comprises: scanning the touch panel for obtaining an N-bit sensed data in a current frame with the touch detection unit; compressing the N-bit sensed data in the current frame to an L-bit sensed data in the current frame with the touch detection unit, wherein N and L are positive integers and L is smaller than N; receiving the L-bit sensed data in the current frame with the processing unit; decompressing the L-bit sensed data in the current frame to the N-bit sensed data in the current frame with the processing unit; and calculating a coordinate of a touch according to the N-bit sensed data in the current frame with the processing unit.

The capacitive touch device and the sensing method of the capacitive touch device are capable of decreasing the time for transmitting the sensed data, the power consumption and the requirements for the memory capacity of the touch detection unit and the memory capacity of the processing unit.

BRIEF DESCRIPTION OF THE DRAWINGS

The present invention will be described in detail in conjunction with the appending drawings, in which.

DETAILED DESCRIPTION OF THE INVENTION

Figure 1:
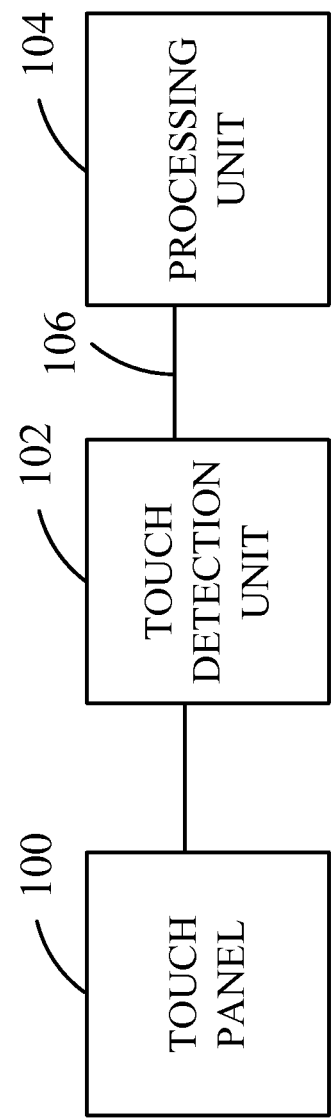
FIG. 1 is a capacitive touch device of the present invention.
Figure 2:
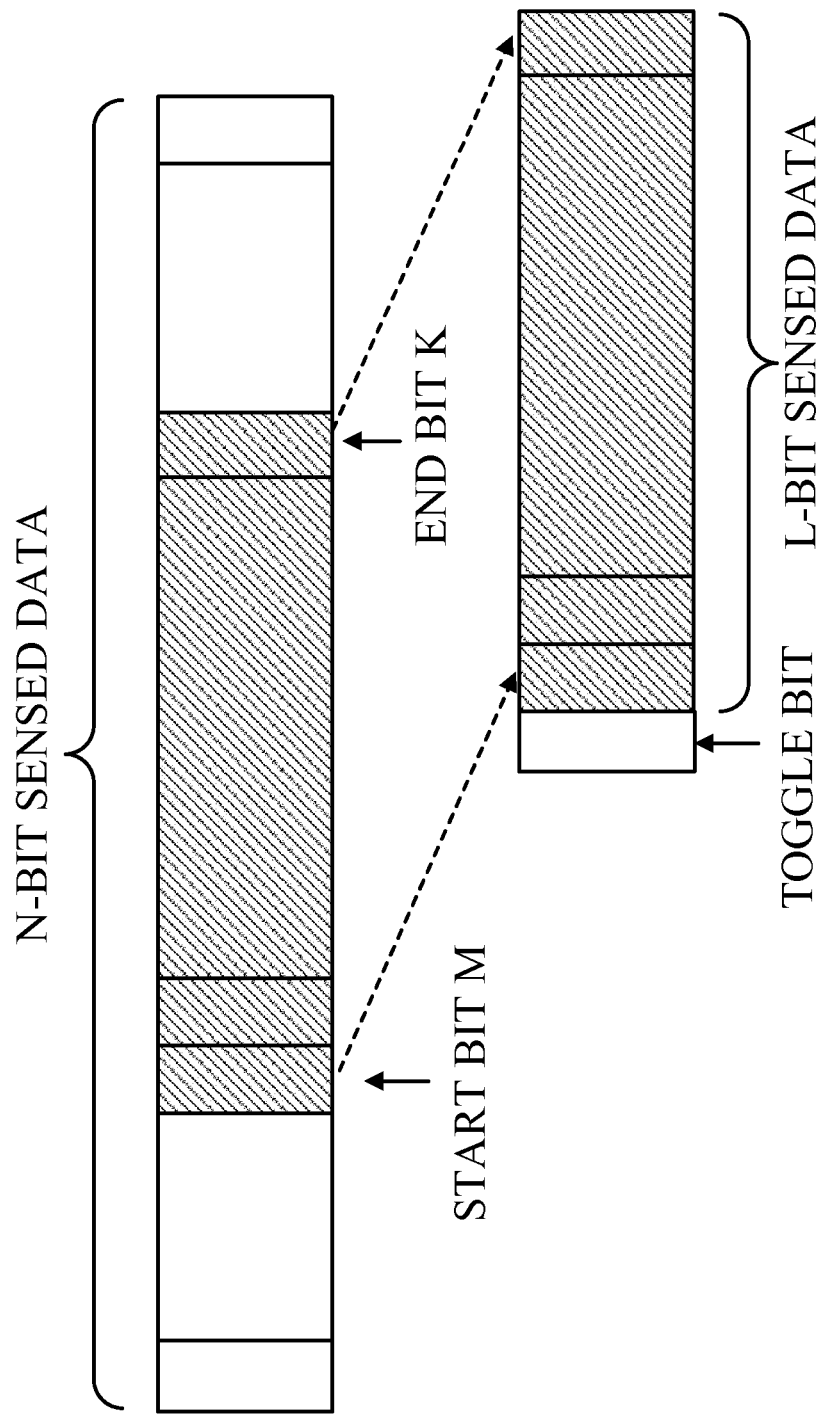
FIG. 2 is a data format of an N-bit sensed data and an L-bit sensed data.

Please refer to FIG. 1 and FIG. 2. FIG. 1 is a capacitive touch device 10 of the present invention. FIG. 2 is a data format of an N-bit sensed data and an L-bit sensed data. The capacitive touch device 10 comprises a touch panel 100, at least one touch detection unit 102 and a processing unit 104. The touch detection unit 102 is electrically coupled to the touch panel 100 for scanning the touch panel 100, obtaining the N-bit sensed data in a current frame and compressing the N-bit sensed data in the current frame to the L-bit sensed data in the current frame. N and L are positive integers and L is smaller than N. The processing unit 104 is electrically coupled to the touch detection unit 102 for receiving the L-bit sensed data in the current frame via an interface 106, decompressing the L-bit sensed data in the current frame to the N-bit sensed data in the current frame, detecting a touch and calculating a coordinate (i.e. a position) of the touch according to the N-bit sensed data in the current frame. In one preferred embodiment, the processing unit 104 is disposed in a host (not shown), and the arithmetic capability of the processing unit 104 is better than that of the touch detection unit 102. The interface 106 is one selected from a group consisting of serial peripheral interface bus (SPI), inter-integrated circuit (I²C) and universal serial bus (USB).

Generally speaking, the touch detection unit 102 comprises a 12-bit to 16-bit analog-to-digital converter (ADC). That is, N is equal to 12 to 16. In the prior arts, all of the N-bit sensed data is transmitted to the processing unit 104, and thus time for transmitting the N-bit sensed data is long, power consumption is high, and a high bandwidth of the interface 106 is required. In the capacitive touch device 10 of the present invention, the N-bit sensed data is compressed to the L-bit sensed data. The L-bit sensed data in the current frame comprises a start bit M and an end bit K, and the start bit M and the end bit K are set in advance by the touch detection unit 102 or the processing unit 104. If L is too small, a compression ratio of the N-bit sensed data can be improved but the coordinate calculated by the processing unit 104 is not accuracy. Accordingly, L cannot be too small. In one preferred embodiment, a data length of the L-bit sensed data in the current frame is a half of a data length of the N-bit sensed data in the current frame. That is, when N is equal to 12, L is equal to 6. When N is equal to 16, L is equal to 8.

In one preferred embodiment, the touch detection unit 102 may further compress the L-bit sensed data in the current frame by one selected from a group consisting of a run-length encoding method, a Shannon-Fano coding method, a Huffman coding method and an exponential-Golomb coding method, such that the compression ratio of the N-bit sensed data can be improved.

By compressing the N-bit sensed data to the L-bit sensed data, the capacitive touch device 10 of the present invention is capable of solving the disadvantages that the time for transmitting the N-bit sensed data is long, the power consumption is high, and the high bandwidth of the interface 106 is required in the prior arts.

When each bit of the L-bit sensed data is "1", it represents that the L-bit sensed data is in a saturated condition. Accordingly, the L-bit sensed data is not enough to be accurately decompressed to the N-bit sensed data. The capacitive touch device 10 of the present invention is capable of adjusting a dynamic range of an L-bit sensed data in a next frame. The dynamic range of the L-bit sensed data in the next frame represents that a range of the L-bit sensed data is adjustable. More particularly, the dynamic range of the L-bit sensed data in the next frame is adjusted by shifting at least one of the start bit and the end bit when each bit of the L-bit sensed data in the current frame is "1".

The saturated condition can be detected by the touch detection unit 102 or the processing unit 104. When the saturated condition is detected by the touch detection unit 102, the touch detection unit 102 directly adjusts the dynamic range of the L-bit sensed data in the next frame by shifting the start bit M and the end bit K left by at least one bit. Accordingly, a data length of the L-bit sensed data in the next frame remains unchanged. In another embodiment, the touch detection unit 102 directly adjusts the dynamic range of the L-bit sensed data in the next frame by shifting only the start bit M left by at least one bit. Accordingly, the data length of the L-bit sensed data in the next frame is increased by at least one bit. Finally, the touch detection unit 102 informs the processing unit 104 that the dynamic range of the L-bit sensed data in the next frame is adjusted. For example, the touch detection unit 102 transmits a toggle bit as shown in FIG. 2 for informing the processing unit 104 that the L-bit sensed data in the next frame starts.

When the saturated condition is detected by the processing unit 104, the processing unit 104 transmits an adjusting instruction to the touch detection unit 102. The touch detection unit 102 adjusts the dynamic range of the L-bit sensed data in the next frame by shifting the start bit M and the end bit K left by at least one bit according to the adjusting instruction. Accordingly, the data length of the L-bit sensed data in the next frame remains unchanged. In another embodiment, the touch detection unit 102 adjusts the dynamic range of the L-bit sensed data in the next frame by shifting only the start bit M left by at least one bit according to the adjusting instruction. Accordingly, the data length of the L-bit sensed data in the next frame is increased. Finally, the touch detection unit 102 informs the processing unit 104 that the dynamic range of the L-bit sensed data in the next frame is adjusted. For example, the touch detection unit 102 transmits the toggle bit as shown in FIG. 2 for informing the processing unit 104 that the L-bit sensed data in the next frame starts.

After the saturated condition does not occur, that is, the touch detection unit 102 or the processing unit 104 does not detect the saturated condition, the increased dynamic range of the L-bit sensed data can be decreased to the original dynamic range.

Figure 3:
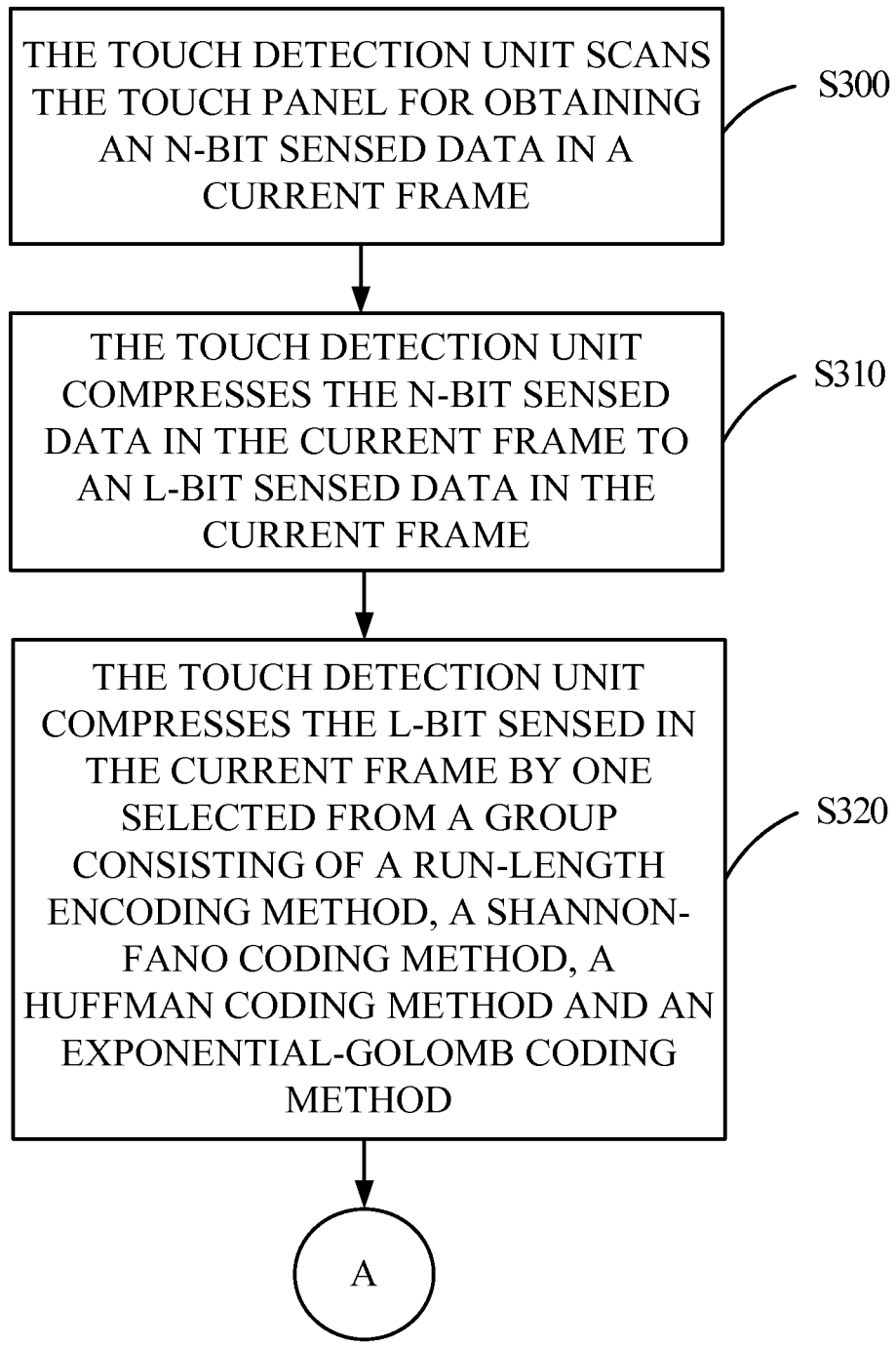
FIG. 3 is a flow chart showing a sensing method of a capacitive touch device of the present invention.
Figure 3:
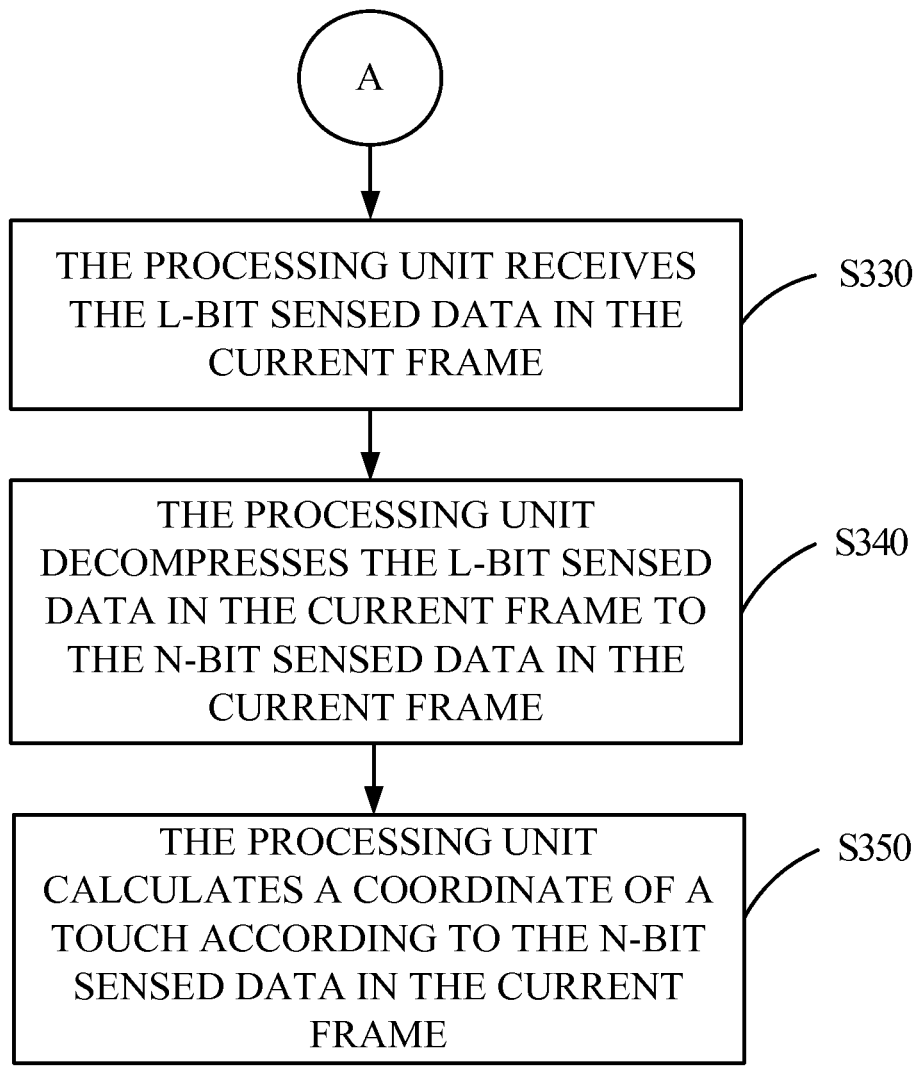

Please refer to FIG. 3. FIG. 3 is a flow chart showing a sensing method of a capacitive touch device of the present invention.

The capacitive touch device comprises a touch panel, at least one touch detection unit and a processing unit.

In step S300, the touch detection unit scans the touch panel for obtaining an N-bit sensed data in a current frame.

In step S310, the touch detection unit compresses the N-bit sensed data in the current frame to an L-bit sensed data in the current frame. N and L are positive integers, and L is smaller than N. In one preferred embodiment, a data length of the L-bit sensed data in the current frame is a half of a data length of the N-bit sensed data in the current frame.

In step S320, the touch detection unit compresses the L-bit sensed data in the current frame by one selected from a group consisting of a run-length encoding method, a Shannon-Fano coding method, a Huffman coding method and an exponential-Golomb coding method. Step S320 is optional.

In step S330, the processing unit receives the L-bit sensed data in the current frame.

In step S340, the processing unit decompresses the L-bit sensed data in the current frame to the N-bit sensed data in the current frame.

In step S350, the processing unit calculates a coordinate of a touch according to the N-bit sensed data in the current frame.

The L-bit sensed data in the current frame comprises a start bit and an end bit, and the start bit and the end bit are set in advance. A dynamic range of an L-bit sensed data in a next frame is adjusted by shifting at least one of the start bit and the end bit when each bit of the L-bit sensed data in the current frame is "1".

In a first embodiment, the touch detection unit adjusts the dynamic range of the L-bit sensed data in the next frame by shifting the start bit and the end bit left by at least one bit, and the touch detection unit informs the processing unit that the dynamic range of the L-bit sensed data in the next frame is adjusted.

In a second embodiment, the touch detection unit adjusts the dynamic range of the L-bit sensed data in the next frame by shifting the start bit left by at least one bit, and the touch detection unit informs the processing unit that the dynamic range of the L-bit sensed data in the next frame is adjusted.

In a third embodiment, the processing unit transmits an adjusting instruction to the touch detection unit. The touch detection unit adjusts the dynamic range of the L-bit sensed data in the next frame by shifting the start bit and the end bit left by at least one bit according to the adjusting instruction, and the touch detection unit informs the processing unit that the dynamic range of the L-bit sensed data in the next frame is adjusted.

In a fourth embodiment, the processing unit transmits an adjusting instruction to the touch detection unit, the touch detection unit adjusts the dynamic range of the L-bit sensed data in the next frame by shifting the start bit left by at least one bit according to the adjusting instruction, and the touch detection unit informs the processing unit that the dynamic range of the L-bit sensed data in the next frame is adjusted.

According to experiments, when the N-bit sensed data is compressed only by one selected from a group consisting of a run-length encoding method, a Shannon-Fano coding method, a Huffman coding method and an exponential-Golomb coding method, the compression ratio is about 50%. When the N-bit sensed data is compressed to the L-bit sensed data and then the L-bit sensed data is further compressed by one selected from a group consisting of a run-length encoding method, a Shannon-Fano coding method, a Huffman coding method and an exponential-Golomb coding method, the compression ratio can be significantly improved from 50% to 15%. Furthermore, requirements for a memory capacity of the touch detection unit and a memory capacity of the processing unit can be decreased as well.

The capacitive touch device and the sensing method of the capacitive touch device are capable of decreasing the time for transmitting the sensed data, the power consumption and the requirements for the memory capacity of the touch detection unit and the memory capacity of the processing unit.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A capacitive touch device, comprising:
   a touch panel;
   at least one touch detection unit electrically coupled to the touch panel for scanning the touch panel, obtaining an N-bit sensed data in a current frame and compressing the N-bit sensed data in the current frame to an L-bit sensed data in the current frame, wherein N and L are positive integers, and L is smaller than N; and
   a processing unit electrically coupled to the touch detection unit for receiving the L-bit sensed data in the current frame, decompressing the L-bit sensed data in the current frame to the N-bit sensed data in the current frame, and calculating a coordinate of a touch according to the N-bit sensed data in the current frame,
   wherein the L-bit sensed data in the current frame comprises a start bit and an end bit, the start bit and the end bit are set in advance, and a dynamic range of an L-bit sensed data in a next frame is adjusted by shifting at least one of the start bit and the end bit when each bit of the L-bit sensed data in the current frame is "1".

2. The capacitive touch device of claim 1, wherein a data length of the L-bit sensed data in the current frame is a half of a data length of the N-bit sensed data in the current frame.

3. The capacitive touch device of claim 1, wherein the touch detection unit further compresses the L-bit sensed data in the current frame by one selected from a group consisting of a run-length encoding method, a Shannon-Fano coding method, a Huffman coding method and an exponential-Golomb coding method.

4. The capacitive touch device of claim 1, wherein the touch detection unit adjusts the dynamic range of the L-bit sensed data in the next frame by shifting the start bit and the end bit left by at least one bit, and the touch detection unit informs the processing unit that the dynamic range of the L-bit sensed data in the next frame is adjusted.

5. The capacitive touch device of claim 1, wherein the touch detection unit adjusts the dynamic range of the L-bit sensed data in the next frame by shifting the start bit left by at least one bit, and the touch detection unit informs the processing unit that the dynamic range of the L-bit sensed data in the next frame is adjusted.

6. The capacitive touch device of claim 1, wherein the processing unit transmits an adjusting instruction to the touch detection unit, the touch detection unit adjusts the dynamic range of the L-bit sensed data in the next frame by shifting the start bit and the end bit left by at least one bit according to the adjusting instruction, and the touch detection unit informs the processing unit that the dynamic range of the L-bit sensed data in the next frame is adjusted.

7. The capacitive touch device of claim 1, wherein the processing unit transmits an adjusting instruction to the touch detection unit, the touch detection unit adjusts the dynamic range of the L-bit sensed data in the next frame by shifting the start bit left by at least one bit according to the adjusting instruction, and the touch detection unit informs the processing unit that the dynamic range of the L-bit sensed data in the next frame is adjusted.

8. A sensing method of a capacitive touch device, the capacitive touch device comprising a touch panel, at least one touch detection unit and a processing unit, the sensing method comprising:
   scanning the touch panel for obtaining an N-bit sensed data in a current frame with the touch detection unit;
   compressing the N-bit sensed data in the current frame to an L-bit sensed data in the current frame with the touch detection unit, wherein N and L are positive integers and L is smaller than N;
   receiving the L-bit sensed data in the current frame with the processing unit;
   decompressing the L-bit sensed data in the current frame to the N-bit sensed data in the current frame with the processing unit; and
   calculating a coordinate of a touch according to the N-bit sensed data in the current frame with the processing unit,
   wherein the L-bit sensed data in the current frame comprises a start bit and an end bit, the start bit and the end bit are set in advance, and a dynamic range of an L-bit sensed data in a next frame is adjusted by shifting at least one of the start bit and the end bit when each bit of the L-bit sensed data in the current frame is "1".

9. The sensing method of the capacitive touch device of claim 8, wherein a data length of the L-bit sensed data in the current frame is a half of a data length of the N-bit sensed data in the current frame.

10. The sensing method of the capacitive touch device of claim 8, further comprising a step of compressing the L-bit sensed data in the current frame by one selected from a group consisting of a run-length encoding method, a Shannon-Fano coding method, a Huffman coding method and an exponential-Golomb coding method with the touch detection unit after the step of compressing the N-bit sensed data in the current frame to the L-bit sensed data in the current frame with the touch detection unit.

11. The sensing method of the capacitive touch device of claim 8, wherein the touch detection unit adjusts the dynamic range of the L-bit sensed data in the next frame by shifting the start bit and the end bit left by at least one bit, and the touch detection unit informs the processing unit that the dynamic range of the L-bit sensed data in the next frame is adjusted.

12. The sensing method of the capacitive touch device of claim 8, wherein the touch detection unit adjusts the dynamic range of the L-bit sensed data in the next frame by shifting the start bit left by at least one bit, and the touch detection unit informs the processing unit that the dynamic range of the L-bit sensed data in the next frame is adjusted.

13. The sensing method of the capacitive touch device of claim 8, wherein the processing unit transmits an adjusting instruction to the touch detection unit, the touch detection unit adjusts the dynamic range of the L-bit sensed data in the next frame by shifting the start bit and the end bit left by at least one bit according to the adjusting instruction, and the touch detection unit informs the processing unit that the dynamic range of the L-bit sensed data in the next frame is adjusted.

14. The sensing method of the capacitive touch device of claim 8, wherein the processing unit transmits an adjusting instruction to the touch detection unit, the touch detection unit adjusts the dynamic range of the L-bit sensed data in the next frame by shifting the start bit left by at least one bit according to the adjusting instruction, and the touch detection unit informs the processing unit that the dynamic range of the L-bit sensed data in the next frame is adjusted.

* * * * *